Patented May 13, 1952

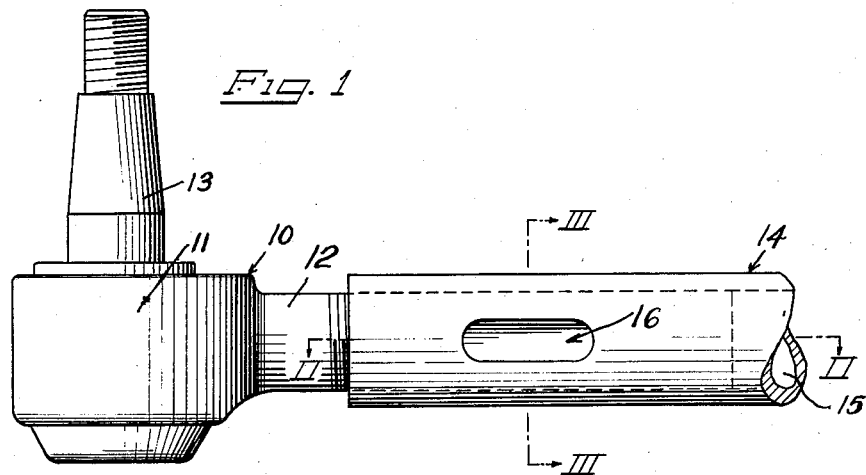
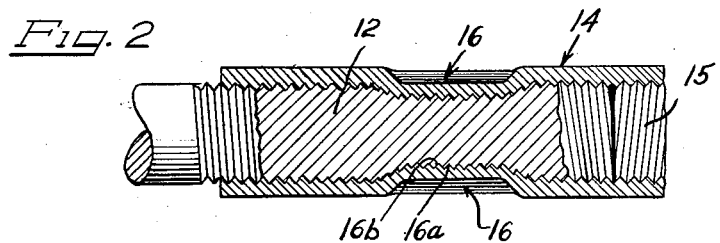
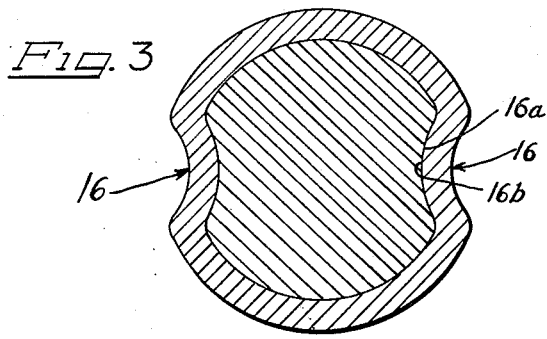

2,596,885

UNITED STATES PATENT OFFICE 2,596,885

LOCK JOINT FOR TIE ROD AND END ASSEMBLIES

James H. Booth, Venice Township, Shiawassee County, Mich., assignor to Thompson Products, Inc., Cleveland, Ohio, a corporation of Ohio Application July 27, 1948, Serial No. 40,891

1 Claim. (Cl. 287—125)

This invention relates to lock joints for telescoped parts, and more particularly relates to a joint construction for locking tie rod ends to tie rods.

In order to join the tie rod end or joint and the tie rod of an automotive steering assembly, it is customary to provide the end or joint with an externally threaded stem and to provide the rod with an internally threaded hollow end to receive the stem. Such joints must be locked, and heretofore it has been customary to slot the tie rod and to contract the slotted rod tightly onto the inserted stem. This construction is expensive and requires the use of a clamp to hold the rod in contracted position. Further, looseness can develop due to play in the threads and loosening of the clamp.

According to the present invention, the heretofore required clamp and slot are eliminated and the threaded-together telescoped parts are locked against relative rotation and also against relative longitudinal movements by locally deforming the parts. The deformations preferably take the form of elongated dimples in the outside member which distort the threads of both members. The threads of each part are compressed into each other to eliminate any radial play between the parts, and, in addition, they are elongated longitudinally against each other to eliminate any end play. Of course, the deformation provides a localized rib which prevents relative rotation of the parts.

It is, then, an object of the present invention to provide a lock for telescoped parts without the aid of additional parts.

Another object of the invention is to provide a lock for threaded joints which will eliminate longitudinal and radial play between the joint members due to looseness of threads.

A further object of the invention is to provide a joint which may be economically constructed and applied.

Other objects will become apparent when considering the following specification, which, when read in conjunction with the accompanying drawings, illustrates a preferred form of the invention.

In the drawings:

Figure 1 is a plan view showing a joint embodying the invention; and

Figures 2 and 3 are cross sections taken on the lines II—II and III—III, respectively, of Figure 1 looking in the direction of the arrows.

Referring to the drawings, a conventional tie rod end or joint 10 has a housing 11 with a laterally extending externally threaded stem 12. The housing provides a socket for a stud 13 which, as is customary, is anchored to a wheel arm (not shown) of an automotive steering assembly.

A tie rod 14 having an internally threaded hollow end 15 receives the stem 12 in threaded telescoped relation therein.

In practice, the stem 12 is screwed into the hollow end 15 of the rod 14 until the housing 11 is in proper adjusted position.

When the threaded-together parts are in adjusted position, the end 15 of the rod 14 is placed in a die (not shown) that completely encompasses the rod end 15 with a snug fit. Opposed punches (not shown) in the die then locally deform the rod end 15 by displacing the metal inwardly, and, in so doing, they also deform those portions of the stem 12 directly under the punches. Dimples 16 are thus formed in the rod and stem on opposite sides. Both the rod end 15 and the stem 12 are forced out of round and the threads in the locally deformed portions are compressed radially and stretched longitudinally. The radially compressed interfitting threads on the respective parts are effectively wedged together into the thread roots while the stretched threads are locked in side by side relation. The parts are thereby loaded radially and axially. At the same time the dimples 16, which are preferably elongated and coaxial with the parts, provide ribs 16a seated in grooves 16b to form a key and keyway lock to hold the parts against relative rotation.

It will be realized that the hereinbefore described form of the invention is to be taken merely as a preferred embodiment thereof and that various changes in size, shape, and arrangement of parts may be made without departing from the spirit of the invention or the scope of the subjoining claim.

That which is claimed as new and is desired to be secured by United States Letters Patent is:

A tie rod and end assembly for a vehicle steering apparatus comprising an end joint having a joint housing with an externally threaded stem projecting therefrom, a tie rod having an internally threaded tubular end receiving the stem in threaded assembly therewith, and diametrically opposed elongated dimples in both the tubular end of the tie rod and the stem and having the long axes thereof extending longitudinally of the stem and rod, said dimples in the tubular end of the tie rod forming elongated keys, said dimples in the stem forming elongated key ways inwardly of the normal root diameter of the stem threads and receiving said keys snugly therein to be filled thereby, the threaded connection between the rod and the stem being distorted at the locale of the opposed dimples to load the rod and stem threads axially and radially in locked together relationship to wedge the threads together into the thread roots under radial load and to stretch the threads into side-by-side relation under axial load thereby creating a multiple locked together relationship of the stem and tie rod.

JAMES H. BOOTH.

REFERENCES CITED

The following references are of record in the file of this patent:

UNITED STATES PATENTS

| Number | Name | Date |
|---|---|---|
| 638,554 | Burton | Dec. 5, 1899 |
| 1,313,075 | Dulle | Aug. 12, 1919 |
| 1,626,863 | Nacey | May 23, 1927 |
| 1,660,455 | Plumb | Feb. 28, 1928 |

FOREIGN PATENTS

| Number | Country | Date |
|---|---|---|
| 129,362 | Switzerland | Dec. 17, 1928 |
| 423,716 | Great Britain | Feb. 6, 1935 |